US008909129B2

(12) United States Patent
Prenzel et al.

(10) Patent No.: US 8,909,129 B2
(45) Date of Patent: *Dec. 9, 2014

(54) METHOD FOR TRANSMITTING DATA, PARTICULARLY HAVING MULTIMEDIA CONTENTS, IN A MOBILE COMMUNICATION NETWORK

(71) Applicant: Network Management Solutions, LLC, Miami, FL (US)

(72) Inventors: Ralf Prenzel, Salzgitter (DE); Andreas Schmidt, Braunschweig (DE); Markus Trauberg, Velchede (DE)

(73) Assignee: Network Management Solutions, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,072

(22) Filed: Jul. 11, 2013

(65) Prior Publication Data

US 2013/0303208 A1 Nov. 14, 2013

Related U.S. Application Data

(63) Continuation of application No. 10/511,056, filed as application No. PCT/DE03/01064 on Apr. 1, 2003, now Pat. No. 8,532,564.

(30) Foreign Application Priority Data

Apr. 9, 2002 (DE) .................................. 102 15 567

(51) Int. Cl.
*H04H 40/00* (2008.01)
*H04H 20/71* (2008.01)
*H04M 1/725* (2006.01)
*H04M 3/53* (2006.01)
*H04W 4/12* (2009.01)
*H04L 29/14* (2006.01)
*H04W 88/18* (2009.01)

(52) U.S. Cl.
CPC .............. *H04W 4/12* (2013.01); *H04M 3/5322* (2013.01); *H04M 2207/18* (2013.01); *H04W 88/184* (2013.01); *H04L 69/40* (2013.01)
USPC ....................... 455/3.06; 455/3.01; 455/412.2

(58) Field of Classification Search
USPC ..................................... 455/3.06, 3.01, 412.2
See application file for complete search history.

(56) References Cited

U.S. PATENT DOCUMENTS

| 6,070,080 | A | 5/2000 | Madour et al. |
| 7,054,592 | B2 * | 5/2006 | Tatsumi et al. ............... 455/3.06 |

(Continued)

FOREIGN PATENT DOCUMENTS

| DE | 101 42 270 A1 | 8/2002 |
| JP | 9018483 A | 1/1997 |

(Continued)

OTHER PUBLICATIONS

Wireless Application Protocol; MMS Encapsulation Protocol; WAP-209-MMSEncapsulation-20020105-a, Jan. 5, 2002, pp. 11-29 (20 pages).
Wireless Application Protocol; Multimedia Messaging Service; Client Transactions Specification; WAP-206-MMSCTR-20020115-a, Jan. 15, 2002, pp. 9-20 (14 pages).

(Continued)

*Primary Examiner* — Bobbak Safaipour
(74) *Attorney, Agent, or Firm* — Procopio, Cory, Heargreaves & Savitch LLP

(57) ABSTRACT

A method is provided for transmitting data, particularly having multimedia contents, from a first communications unit to a second communications unit (40; 114) in a telephone communications network, whereby at least one transmission status message assigned to the data is transmitted to the first communications unit. In the event that data cannot be delivered to the second communications unit, an item of information concerning a non-deliverability of the sent data is provided in the transmission status message.

21 Claims, 2 Drawing Sheets

X-Mms-Status (0x15): ← 210

Status-value=Expired | Retrieved | Rejected | Deferred | Unrecognised | Undeliverable

Expired=<Octet 128>
Retrieved=<Octet 129>
Rejected=<Octet 130>   ← 212
Deferred=<Octet 131>
Unrecognised=<Octet 132>
Undeliverable=<Octet 133>

(56) References Cited

U.S. PATENT DOCUMENTS

| | | | |
|---|---|---|---|
| 7,127,264 B2 * | 10/2006 | Hronek et al. | 455/466 |
| 7,185,015 B2 * | 2/2007 | Kester et al. | 1/1 |
| 7,191,159 B2 * | 3/2007 | Horvitz | 706/1 |
| 7,194,681 B1 * | 3/2007 | Horvitz | 715/236 |
| 7,194,755 B1 * | 3/2007 | Nakata et al. | 725/78 |
| 2001/0010685 A1 | 8/2001 | Aho | |
| 2007/0136215 A1 | 6/2007 | Fogel et al. | |

FOREIGN PATENT DOCUMENTS

| | | |
|---|---|---|
| JP | 2002010363 A | 1/2002 |
| WO | 9109473 A1 | 6/1991 |
| WO | 9966746 A2 | 12/1999 |
| WO | 0064110 A1 | 10/2000 |
| WO | 0128171 A1 | 4/2001 |
| WO | 0135622 A1 | 5/2001 |
| WO | 0197504 A1 | 12/2001 |

OTHER PUBLICATIONS

3G TS 22.140 version 4.1.0, Release 4; Third Generation Partnership Projection; Technical Specification Group Terminals; Multimedia Messaging Service (MMS); Service Aspects; Stage 1, Mar. 2001.
3G TS 23.140 version 4.2.0, Release 4; Third Generation Partnership Project; Technical Specification Group Terminals; Multimedia Messaging Service (MMS); Functional Description; Stage 2, Mar. 2001.
WAP-205-MMS Client Architecture Overview, Draft Specification; Wireless Application Protocol, Multimedia Messaging Service; Architecture Overview Specification, Apr. 25, 2001.
WAP-2006-MMS Client Transactions, Draft Specification; Wireless Application Protocol; WAP Multimedia Messaging Service Client Transactions; Apr. 12, 2001.
WAP-209-MMS Encapsulation, Draft Specification Change Document; Wireless Application Protocol; Multimedia Messaging Service; Message Encapsulation; Jan. 5, 2002.
WAP-203-WSP, Specification, Approved Version, Wireless Application Protocol: Wireless Session Protocol, May 4, 2004.

* cited by examiner

FIG 3

X-Mms-Status (0x15): ← 210
Status-value=Expired | Retrieved | Rejected | Deferred | Unrecognised | Undeliverable Expired=<Octet 128>
Retrieved=<Octet 129>
Rejected=<Octet 130>        ← 212
Deferred=<Octet 131>
Unrecognised=<Octet 132>
Undeliverable=<Octet 133>

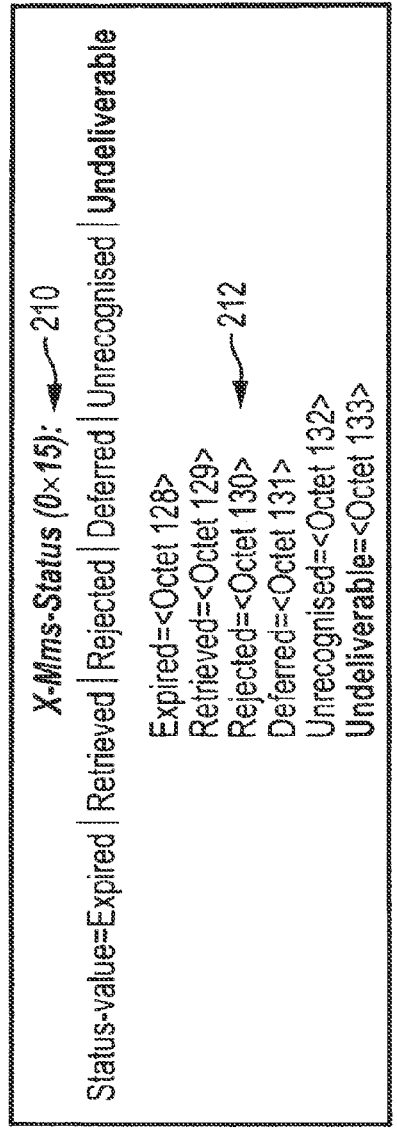

FIG 4

M-Delivery.ind (M-SR→M-UA-A):

X-Mms-Message-Type: m-delivery-ind
X-Mms-Version: 1.0
X-Mms-Message-ID: MESSAGE-ID #1
To: NutzerB@SP-B.de
Date: Tue, 22 May 2001 11:11:11+0200
X-Mms-Status: Undeliverable

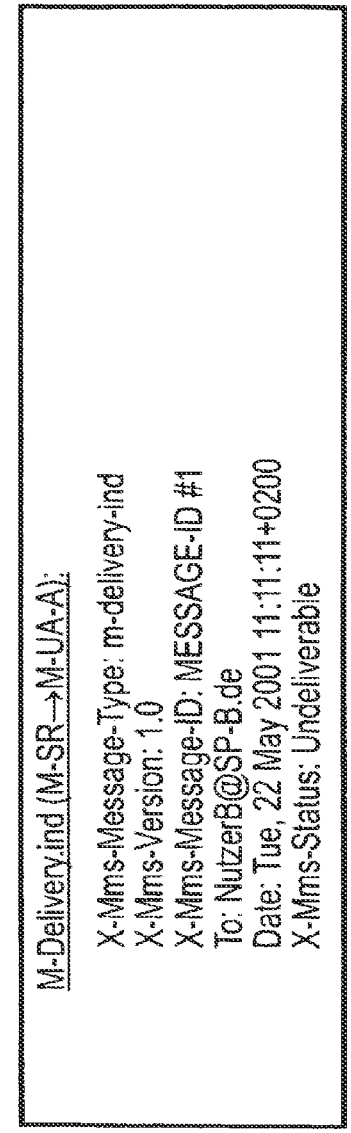

METHOD FOR TRANSMITTING DATA, PARTICULARLY HAVING MULTIMEDIA CONTENTS, IN A MOBILE COMMUNICATION NETWORK

RELATED APPLICATIONS

This application is a continuation of U.S. application Ser. No. 10/511,056 filed Oct. 11, 2004, which is a U.S. national stage application of International Application No. PCT/DE03/01064 filed Apr. 1, 2013, which designates the United States of America, and claims priority to German application Ser. No. 102 15 567.4 filed Apr. 9, 2002, the contents of which are hereby incorporated by reference in their entirety.

FIELD OF THE INVENTION

The present invention relates to a method for transmitting data, particularly having multimedia contents, from a first communications unit to a second communications unit in a mobile communication network, whereby at least one transmission status message assigned to the data is transmitted to the first communications unit.

BACKGROUND OF THE INVENTION

Current mobile communication networks, such as networks operating according to the GSM standard (GSM: Global System for Mobile Communication), offer only limited possibilities for transmitting textual data. Thus, for example, only text messages having up to 160 characters can be transmitted via the SMS (Short Message Service). The cost of sending text messages of this type has to be born by the sender of the data.

In the future, the transmission of multimedia data, particularly images or films with or without audio, also will be possible. The successors to the essentially voice/text-based telecommunications systems, such as those defined by the GSM standard, for example, are seen in multimedia-capable mobile communication systems, such as those defined by the UMTS standard (UMTS: Universal Mobile Telecommunications System). The UMTS or GPRS standard envisions providing, for example, in addition to the current SMS, a so-called MMS (Multimedia Messaging Service) for transmitting messages may include multimedia contents, also referred to as "Multimedia Messages" (MMs). Formatted text, images, videos and films with and without audio also can be transmitted in this way. The restriction to a message length of 160 characters present in the SMS does not apply.

According to the state of the art, the MMS can be implemented by way of the WAP (Wireless Application Protocol), for example. For the purposes of bridging the air interface between an MMS-enabled terminal, such as a corresponding mobile phone, and the "WAP Gateway" on the network side, the employment of the WAP-WSP (WSP: Wireless. Session Protocol) [6] can be used according to [2].

For purposes of the internal management of such MMS-over-WAP transmissions, use is made of so-called "header fields", that is to say, fields placed in advance of the actual multimedia message (MM) which can contain items of information concerning origin, transmission time, file size and other details, for example.

If the MMS is implemented by way of the WAP in a mobile communication network, at least one MMS connection unit or MM switching arrangement is provided within the network which takes over the handling of the MMs in that mobile communication network. This includes, for example, the switching of the MMs between the sender and the recipient and the intermediate storage of the MMs.

In this respect, the sender first sends a message (MM) to the MMS connection unit, whereby the sender or the MMS connection unit can confer a period of validity on the message, after the expiration of which the corresponding MM can no longer be downloaded from the MMS connection unit by the recipient. The recipient receives the item of information concerning the period of validity until the expiration of the MM together with the MMS recipient notification which is sent to the recipient or the receiving MMS user application by the MMS connection unit.

A number of statuses which describe the transmission status of a multimedia message (MM) is known from the MMS specification [2, 5]. Various statuses can indicate, for example, whether an MM has been transmitted successfully (status: "Retrieved"), whether the MM has been rejected by the recipient (status: "Rejected"), whether the recipient has received the notification concerning the arrival of the MM in its mailbox and can download the message later (status: "Deferred"), whether the recipient has been able to recognize the MM (status: "Unrecognized") and whether the recipient has not downloaded the MM within a definable period of validity and therefore received it in full (status: "Expired").

These statuses can be sent to the first telecommunications apparatus by the switching arrangement in response to a request for a transmission status message. These messages can be sent either following an acknowledged recipient notification message, following the successful delivery of an MM or following the expiration of the period of validity of the MM.

If the sender of an MM receives the requested MMS transmission status message relating to a message which it has sent, such sender cannot decide in the event of the received status "expired," for example, whether the recipient has intentionally not downloaded the sent MM from the MMS connection unit or whether the recipient was just not available within the period of validity of the MM and therefore the MM could not be delivered. The sender therefore has no way of deciding whether it should possibly send the corresponding MM again with an increased period of validity so that the MM can reach the recipient.

An object of the present invention is, therefore, to offer the transmitter or sender of data, particularly of a multimedia message (MM), a more detailed item of information concerning the deliverability of the data which it has sent.

SUMMARY OF THE INVENTION

In the case of a method for transmitting data, particularly having multimedia contents, from a first communications unit to a second communications unit in a telecommunications network, at least one transmission status message assigned to the data is transmitted to the first communications unit; for example, following the sending of a data transmission. Furthermore, in the event of the non-deliverability of the data to the second communications unit, an item of information concerning the non-deliverability of the sent data is provided in the transmission status message.

The method according to the present invention enables the first communications unit or a sender of data to recognize the fact that the data which it has sent could not be delivered to the second communications unit or an envisioned recipient. According to the methods known in the state of the art, a sender of data has not been able to recognize up until now whether the data could not be delivered to a recipient due to an incorrect recipient address, for example, or whether the recipient did not wish to receive the data. This item of information is important to the sender of the data since in the first case it could attempt to transmit the data again, whereas in the second case such a repeat transmission is not worthwhile since the recipient already has consciously decided not to opt to receive the data.

To ensure that the data to be transmitted is kept up to date, the sender of the data can define a period of validity within which the data must be delivered to the recipient. The method according to the present invention can, therefore, be advantageously configured in such a way that the item of information concerning the non-deliverability of the sent data is provided in the transmission status message if the data has not been delivered to the second communications unit within the defined period of validity. In this case, the sender of the data can decide, given the non-deliverability of the data, whether to send the data to the second communications unit (recipient) again or whether the data is already no longer up to date and therefore should no longer be used.

One possible way of recognizing the non-deliverability of the data sent to the second communications unit consists in implementing so-called confirmation messages within a data transmission protocol which is used in the case of the transmission of data between the first and second communications units. Via such confirmation messages, the recipient of data or messages notifies the sender or, in some circumstances, possible switching centers provided in the data transmission path of the fact that it has correctly received the data or messages. "Correctly received" refers to, particularly in connection with the present description, the recipient or the second communications unit being able to fully recognize the content of the data or messages transmitted. It is therefore possible to define, in the case of the method according to the present invention, that non-deliverability of the data sent applies if the correct receipt of the data sent and/or the receipt of a recipient notification message relating to the data to be transmitted to the second communications unit is not acknowledged by the second communications unit via a respectively associated confirmation message. It should be noted that the recipient notification message involves a message to the second communications unit to notify the communications unit that data is to be transmitted to it.

Telecommunications systems can provide for the eventuality that data from a sender is not forwarded directly to a recipient, but that the recipient first receives a notification that the wish exists to send data to it. Following the receipt of such a recipient notification message, the recipient can then choose whether it would like to receive the data or have it delivered immediately or later, or whether it is opting to decline to receive the data.

To ensure efficient data transmission between the first and second communications units, the telecommunications network may include a switching arrangement as defined by a further advantageous configuration, by way of which the data is transmitted from the first communications unit to the second. In this respect, the switching arrangement can be embodied in such a way that it is capable of establishing the non-deliverability of the data sent; for example, by interrogating or capturing confirmation messages. It should be noted that if a switching arrangement receives data from the first communications unit, it can inform the second communications unit of this with the above-mentioned recipient notification message. Furthermore, it can be the task of such a switching arrangement to send the transmission status message to the first communications unit and, therefore, to inform it of the status of the data to be transmitted. Such a switching arrangement within the telecommunications network can be provided, for example, in a switching node of the network but, for example, the switching arrangement also can be distributed across a number of switching nodes or implemented in units which otherwise possess no switching node properties but are still incorporated in the telecommunications network.

The most diverse data, particularly having multimedia contents, can be sent particularly effectively by using the "Multimedia Messaging Service" (MMS), which provides a defined standard for formatting and sending messages and data with multimedia contents (MMs: Multimedia Messages) [1, 2]. The MMS can be implemented advantageously by using the "Wireless Application Protocol" (WAP) [3, 4, 5, 6]. The WAP offers the possibility of transmitting the most diverse types of data, such as texts, images, videos and/or audio data, for example, and also of being able to access the Internet in an efficient manner in mobile communication networks. More precise explanations of how data can be transmitted via MMS over WAP can be found, for example, in the references [3, 4, 5] relating to this description.

In the case of the use of multimedia messages of the MMS over WAP, various data transfer and message transmissions are provided. Within the WAP protocol, as outlined in reference 5 relating to this description, each of these transmission types is described via a data field "X-Mms-Message-Type" within the message.

Thus, within the method according to the present invention, a recipient notification message would be an MMS-over-WAP message in the category "m-notification.ind" [5].

The transmission of multimedia messages with the WAP protocol provides for the handling and the intermediate storage of the multimedia message via a switching center referred to as an "Mms-Relay/Server." From this, for example, data to be transmitted is sent to the recipient.

Within the method according to the present invention, the transmission of the multimedia message to the recipient preferably has the WAP category "m-retrieve.conf," as described in reference [5].

The transmission status message according to the present invention to the sender of the data to be transmitted then can be assigned to the category "m-delivery.ind" in line with the WAP protocol.

Within the WAP protocol, a field with the designation "X-Mms-Status" can be provided in transmission status messages of the type "m-delivery.ind," in which the transmission status of the data to be sent is recorded. A number or digit combination assigned to "non-deliverability" is advantageously recorded in this field in the method according to the present invention if non-deliverability of the data to the second communications unit applies. In the context of the parameters known to date, the value "<Octet 133>" particularly can be used for this.

Telecommunications devices with a mobile communication module can be used as communications units in the context of the present invention. These can constitute mobile telephones, for example, or even PCs (Personal Computers), laptops, palmtops, organizers or PDAs (PDA: Personal Digital Assistant) which include a mobile telecommunications module or, for example, are connected to a mobile telephone by way of a wire connection or a wireless local network (e.g., Bluetooth, infrared interface).

The telecommunications network can be embodied as a mobile communication network at least in areas. The mobile communication network and/or the communications units can be embodied, for example, as per one of the customary mobile communication standards, such as the GSM standard, the GPRS standard, the EDGE standard, the UMTS standard or one of the various CDMA standards, for example. The fact that the telecommunications network can be embodied as a mobile communication network at least in areas results in at least one part of the transmission path between the first telecommunications unit and the second running within mobile communication network. Further parts of the transmission path can run, for example, on the Internet, in data networks and/or in fixed telecommunications networks or in combinations thereof. But it is also possible for the telecommunications network to be embodied entirely as a mobile communication network or a combination of various mobile communication networks.

As defined by a further aspect of the present invention, a switching arrangement is created for transmitting data in a telecommunications network from a first communications unit to a second communications unit, whereby the switching arrangement included an apparatus for producing or generating a transmission status message which is assigned to the data to be transmitted to the second communications unit, whereby the apparatus for producing the transmission status message furthermore integrates an item of information concerning the non-deliverability of the data to be transmitted into the transmission status message if the data cannot be delivered to the second communications unit.

It is possible with the switching arrangement described to notify the sender, or the first communications unit, of a message if data which it has sent to a recipient, or the second communications unit, could not be delivered to the recipient at all. The sender can then decide, for example, to send the corresponding data again. Compared with the currently known state of the art on this matter, the sender is therefore given the opportunity to distinguish the non-availability of a recipient from the status in which the recipient has not called up data provided for it, since it did not wish to receive the messages or was simply prevented from calling up the data (for example, due to technical problems).

To ensure that the data to be sent has the most up-to-date status possible, it is possible to provide for the apparatus for producing the transmission status message of the switching arrangement to provide the item of information concerning the non-deliverability of the data to be transmitted in the transmission status message if the data cannot be delivered to the second communications unit within a definable period of validity. Such a period of validity can be defined, for example, by the sender of the data or even within the telecommunications network (via a default setting, for example). A period of validity also may be stored in the user profile of an envisioned recipient of the data, for example. The introduction of a period of validity following which data to be sent is no longer delivered to a recipient makes sure that only up-to-date data is ever waiting to be transmitted. This prevents mobile communication networks or their switching arrangements being burdened or even overburdened by old, no longer up-to-date messages, for example.

If it has received the recipient notification message, the message transmission or multimedia message, the recipient can notify the switching arrangement that it has received the message (correctly). "Correctly" in this connection means, as already mentioned in the foregoing, that it can fully recognize the content of the respective messages. If a user has not switched its telecommunications device on over a complete period, for example, or if it is nonoperational, the switching arrangement will not receive any confirmation message relating to corresponding transmissions to the second communications unit.

The establishment of when "non-deliverability" of the data sent applies can apply with regard to the switching arrangement if the correct receipt of the data sent or of a recipient notification message to the second communications unit relating to the data sent is not acknowledged via a respective associated confirmation message. It can be provided in the switching arrangement, for example, that the data to be transmitted is placed in intermediate storage in the switching arrangement and the envisioned recipient is only informed via a notification (the recipient notification message) that a message, for example with corresponding multimedia data, is ready for it.

In the event that the recipient, particularly following the transmission of a recipient notification message, does not wish to receive the assigned message, the correct receipt of the recipient notification message would indeed be acknowledged by the second communications unit but, subsequently, the transmission of the actual message not requested. No delivery takes place, therefore, in spite of notification of the second communications unit concerning data or messages to be transmitted.

To inform the sender (the first communications unit) concerning the respective transmission status of the data which it has sent, it is possible to provide for the switching arrangement to include an apparatus for transmitting the transmission status message to the first communications unit. For example, the switching arrangement can send the transmission status message direct to the sender of the relevant data or even by way of another switching arrangement. But the transmission status message also could be transmitted to a message store (a so-called "Mailbox") of the sender of the data, for example, from which it then can call up the transmission status message.

Additional features and advantages of the present invention are described in, and will be apparent from, the following Detailed Description of the Invention and the figures.

BRIEF DESCRIPTION OF THE FIGURES

FIG. 3 shows possible statuses of the X-Mms-Status of an "m-delivery.ind" transmission confirmation message for a multimedia message over WAP.

FIG. 4 shows an example of an "m-delivery.ind" transmission confirmation message for an MMS message over WAP.

DETAILED DESCRIPTION

Figure 1:
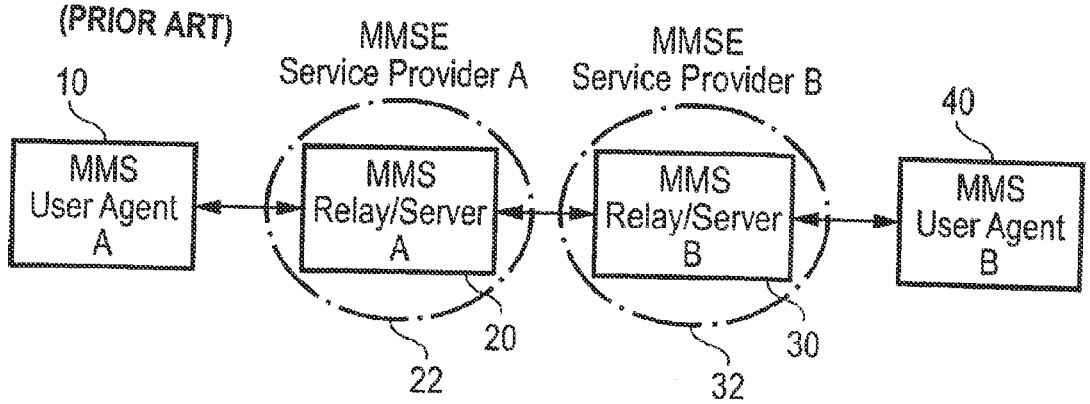
FIG. 1 shows a schematic representation of a telecommunications system for transmitting multimedia messages (MMs).

FIG. 1 shows an MMS network architecture according to the present-day state of the art as defined by 3GPP (ref. [1, 2]). As a first MMS user application A (MMS User Agent A) 10, an application is shown, for example on a mobile communication device which corresponds to a first communications unit or on a device connected to a mobile communication device (e.g., laptop or similar) which implements the MMS. Furthermore, a first MMS connection unit 20 is shown, for example in the form of a so-called "MMS-Relay/Server" which makes the MMS functionality available to the MMS user applications within an area of responsibility MMSE (MMSE: Multimedia Messaging Service Environment) 22 of an MMS Service Provider A. According to the state of the art, there is only one MMS connection unit 20 per MMSE 22 in each case. The MMS connection unit 20 of the Service Provider A is connected to a further MMS connection unit 30 of a Service Provider B which, in turn, is in contact with a recipient 40. This recipient 40 is represented by a second MMS user application B (MMS User Agent B) 40 which similarly represents an application; for example, on a mobile communication device which corresponds to a second communications unit.

A multimedia message is transmitted from the sender 10 to the corresponding connection unit 20 of its Service Provider A 22. Since the recipient of the message 40 is located in an area of responsibility 32 of the second Service Provider B, the multimedia message is conveyed to the connection unit 30 responsible for the second area of responsibility 32. The message is then forwarded by this switching unit to the recipient of the multimedia message 40.

The connections between the sender 10, the MMS connection unit A 20, the MMS connection unit B 30 and the recipient 40 are shown with an outgoing and an incoming arrow, in each case, in FIG. 1 to document the fact that in the case of the forwarding of the message, corresponding receipt confirmation messages are also sent back to the respective senders (sender 10, MMS connection unit A 20 and MMS connection unit 30). It should be noted that the MMS connection units 20 and 30 can be used as one switching arrangement.

Figure 2:
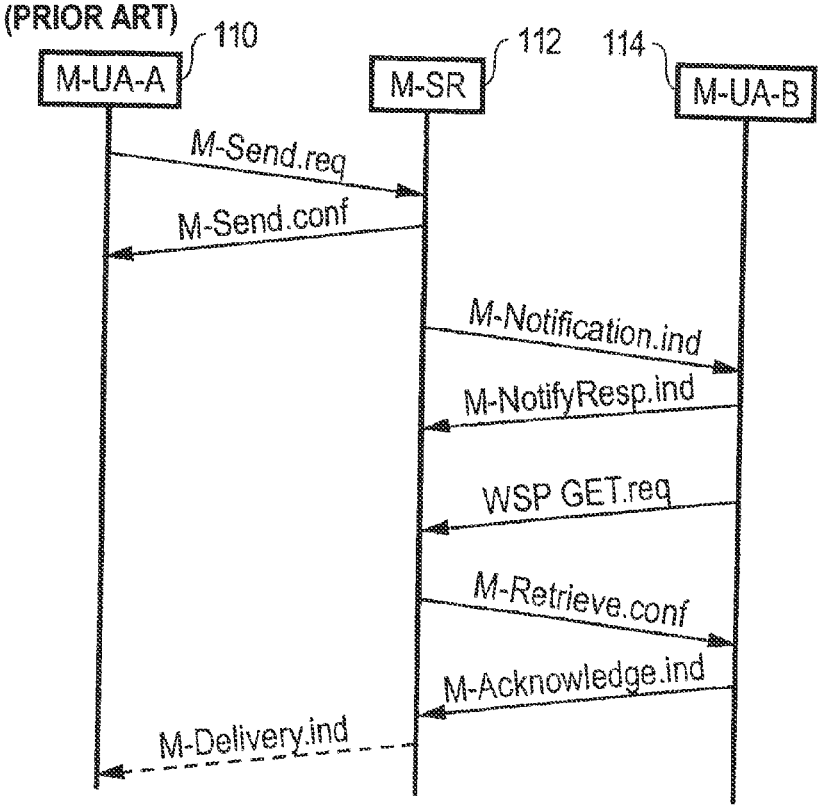
FIG. 2 shows a chart representing the flow of information in the case of the sending of an MM within the WAP.

An example of the course of a transmission of a multimedia message from a sender 110 (e.g., corresponding to the sender 10 in FIG. 1) to a recipient 114 (e.g., corresponding to the recipient 40 in FIG. 1) by way of an MMS switching unit 112 (e.g., corresponding to one or both unit(s) 20, 30 in FIG. 1) is shown in detail in FIG. 2. Diagram 2 shows a message flow chart according to the present-day state of the art as defined by [4], whereby the exchange of the WAP messages or WAP items of information between three participating entities (the MMS user application A (M-UA-A) 110, the MMS switching unit (M-SR) 112 and the MMS user application B (M-UA-B) 114) is shown in the case of the sending or receipt of an MM. The sender of the data 110 includes at least one telecommunications device and similarly the recipient includes a telecommunications device. As already mentioned, these telecommunications devices can be embodied, for example, as customary handsets or as devices with further input or display functions, such as laptops with a mobile communication module, for example.

The exemplary embodiment shown in FIG. 2 shows the transmission of MMs by using the WAP standard as is used, for example, in the case of the transmission of image data, video data, audio data and formatted text data in the UMTS standard (UMTS: Universal Mobile Telecommunication Standard). However, the present invention is also correspondingly transferable to other telecommunications standards, such as GSM or DECT (DECT: Digital European Cordless Telephone), for example.

The items of information or messages which are shown with arrows in the flow chart in Diagram 2 are exchanged between the three participating entities 110, 112, 114. A multimedia message (MM) essentially consists of a header and optionally a body, which can contain the multimedia objects.

A multimedia message (MM) composed in or to be forwarded by way of the telecommunications device of the sender 110 can contain one or more units or objects; for example, individual images, film sequences, texts or similar. As shown in FIG. 2, the MM is sent first to the Provider/the switching unit 112 as a request transmission (this bears the name "M-Send.req" in the WAP protocol). From there, the MM received is acknowledged to the sender 110 with a return transmission "M-Send.conf".

Thereafter, a recipient notification message "M-Notificaton.ind" is sent to the envisioned recipient 114 by the switching unit 112, with which the recipient is informed of the fact that an MM is ready for downloading for it at the switching unit 112. In this respect, the switching unit 112 receives the acknowledging reply message or recipient notification message "M-NotifyResp.ind", from the telecommunications device 114 of the recipient automatically, for example, if the recipient has correctly received the recipient notification message.

Only upon request by the recipient 114 with the request message "WSP GET.req" is the MM forwarded to the recipient by the switching unit 112 with the MM transmission "M-Retrieve.conf".

A further receipt confirmation message, this time m the category "M-Acknowledge.ind," acknowledges the receipt of the MM.

Finally, if so wished by the sender 110, the switching unit 112 sends a message "M-Delivery.ind," concerning the status of the delivery of the MM, to the sender. It should be noted that in this respect the transmission status message is generated by a first apparatus (not shown) of the switching unit 112, which is provided for the purpose, and is then sent by a second apparatus (also not shown), which is provided for the purpose, from 112 to the sender 110. In this respect, the message "M-Delivery.ind" in the WAP protocol, to which the present example refers, contains a status field ("X-Mms-Status") 210 (FIG. 3) which describes the status of the MM upon the sending of the status message "M-Delivery.ind".

FIG. 3 shows, in general terms, the possible statuses 212 of the status field "X-Mms-Status" 210 in the message of the type "M-Delivery.ind" which is explained in detail in FIG. 4. A number of statuses are currently defined in the MMS specification [2, 5] which are transmitted in an MMS delivery status notification or transmission status messages "M-Delivery.ind." The various statuses indicate whether the MM has been transmitted successfully to the recipient (status: "retrieved"), whether the MM has been rejected by the recipient (status: "rejected"), whether the recipient has received the notification concerning the arrival of the MM in its mailbox and can download it later (status: "deferred"), whether the recipient has not recognized the MM (status: "unrecognized") and whether the recipient has not downloaded the MM within the period of validity and has therefore not received it in full (status: "expired").

According to the present invention, the status field "X-Mms-Status" can also take on a status "undeliverable." The new status ("undeliverable") is placed in the requested transmission status message "M-Delivery.ind" by the MMS connection unit 112 (see FIG. 2) if an MM could not be delivered within its period of validity, that is to say that the connection unit has not received either the (first) receipt confirmation message "M-NotifyResp.ind" or the second receipt confirmation message "M-Acknowledge.ind" for the MM transmission from the recipient. As such neither the MMS recipient notification message (M-Notification.ind) nor the MM transmission (M-retrieve.conf) has reached the recipient correctly. ( FIG. 3 similarly shows how the corresponding statuses of the "X-Mms-Status" register in the present example are encoded within the system. Thus, the values "<Octet 128>" to "<Octet 132>" are assigned to the known statuses "Expired" to "Unrecognized," whereas the status "Undeliverable" is represented with the value "<Octet 133>" within the system.

FIG. 4 shows a transmission status message m the category "M-delivery.ind" as sent to the sender 10, 110 of a multimedia message by means of the WAP protocol. The header shows that the message is being sent from the switching unit 20, 30, 112 to the sender 10, 110. A first data field "X-Mms-Message-Type" shows what type of message it is. In this case, it is the notification of the sender of the MM concerning the transmission status of the MM message, which is categorized within the WAP protocol with "m-delivery.ind". The next data field, which is designated as "X-Mms-version," documents the version of the MMS WAP protocol being used. The following field with the designation "X-Mms-Message-ID" records the internal number of the multimedia message (MM) to which the transmission status message refers. The field with the designation "To" contains the recipient, while the date field with the designation "Date" contains the date on which the multimedia message was last handled. For example, this can be the date of transmission to the recipient, the date of rejection or even the expiration date of the period of validity of the transmission to the recipient. The last field in this transmission status message with the designation "X-Mms-Status" shows the actual transmission status of the multimedia message. In the present example, the MM is not capable of being forwarded to the recipient or not deliverable; i.e., the recipient has not acknowledged the recipient notification message or even a number of recipient notification messages, for example, because its telecommunications device was never switched on or is faulty, for example.

The present invention describes a method for transmitting data, particularly having multimedia contents, from a sender to a recipient, whereby the non-deliverability of the data to the recipient is notified to the sender if the message which the sender has sent is not deliverable. Where relevant, the sender can then send the message again. This allows efficient handling of multimedia messages since, for example, the message would only be sent a second time in the case of non-deliverability and not in the case that the recipient does not want delivery. This distinction was not possible in the current state of the art.

Although the present invention has been described with reference to specific embodiments, those of skill in the art will recognize that changes may be made thereto without departing from the spirit and scope of the present invention as set forth in the hereafter appended claims.

What is claimed is:

1. A method for operating a switching arrangement for handling data having multimedia content transmitted from a first communications unit to a second communications unit in a communications network, the method comprising:
    determining, in the event that the data has not been delivered to the second communications unit, a non-delivery reason from at least two reasons, wherein the at least two reasons are
        that the switching arrangement could not deliver the data to the second communications unit and
        that the data could be delivered to the second communications unit but was not received by the second communication unit; and
    transmitting a transmission status message to the first communications unit, the transmission status message indicating, based upon the determining, said non-delivery reason.

2. The method of claim 1 wherein the determining a non-delivery reason from at least two reasons comprises determining whether the data was not delivered to the second communications unit within a period of validity.

3. The method of claim 1 further comprising
    transmitting a recipient notification message from the switching arrangement to the second communications unit; and
    wherein determining a non-delivery reason from at least two reasons comprises determining whether the recipient notification message from the switching arrangement to the second communications unit was acknowledged by the second communications unit.

4. The method of claim 3 wherein the determining a non-delivery reason from at least two reasons further comprises determining whether correct receipt of the data sent to the second communications unit was not acknowledged by the second communications unit.

5. The method of claim 2 wherein the period of validity is received by the switching arrangement from the first communication unit.

6. The method of claim 1 wherein the determining a non-delivery reason from at least two reasons further comprises determining whether correct receipt of the data sent to the second communications unit was acknowledged by the second communications unit.

7. The method of claim 1 further comprising the switching arrangement transmitting a message to the second communications unit indicating that the data is ready for downloading.

8. The method of claim 1 wherein the determining a non-delivery reason from at least two reasons and the transmitting a transmission status message to the first communications unit are performed in a single node of the communications network.

9. The method of claim 1 wherein the determining a non-delivery reason from at least two reasons is performed on a first node in the communications network and the transmitting a transmission status message to the first communications unit is performed in a second node of the communications network.

10. The method of claim 7 wherein the determining a non-delivery reason from at least two reasons further comprises determining that an acknowledgement from the second communications unit of the message indicating that the data is ready for downloading was received by the switching arrangement and that an acknowledgment of receipt of the data was not received from the second communications unit.

11. The method of claim 1, wherein the data is transmitted via a Multimedia Messaging Service using a Wireless Application Protocol.

12. A switching arrangement for handling data having multimedia content transmitted from a first communications unit to a second communications unit in a communications network, the switching arrangement comprising:
    a first apparatus which determines, in the event that the data has not been delivered to the second communications unit, a non-delivery reason from at least two reasons, wherein the at least two reasons are
        that the switching arrangement could not deliver the data to the second communications unit and
        that the data could be delivered to the second communications unit but was not received by the second communication unit; and
    a second apparatus which transmits a transmission status message to the first communications unit, the transmission status message indicating, based upon the determining, the non-delivery reason.

13. The switching arrangement of claim 12 wherein the first apparatus further determines whether the data was not delivered to the second communications unit within a period of validity.

14. The switching arrangement of claim 12 wherein the first apparatus further transmits a recipient notification message to the second communications unit and determines whether the recipient notification message was acknowledged by the second communications unit.

15. The switching arrangement method of claim 14 wherein the determining a non-delivery reason from at least two reasons further comprises determining whether correct receipt of the data sent to the second communications unit was not acknowledged by the second communications unit.

16. The switching arrangement of claim 12 wherein the first apparatus is located on a first node in the communications network and the second apparatus is located on a second node in the communications network.

17. The switching arrangement of claim 12 wherein the first apparatus further determines whether correct receipt of the data sent to the second communications unit was acknowledged by the second communications unit.

18. The switching arrangement of claim 12 wherein the first apparatus further transmits a message to the second communications unit indicating that the data is ready for downloading.

19. The switching arrangement of claim 18 wherein the first apparatus further determines that the data could not be delivered to the second communications unit when an acknowledgement from the second communications unit of the message indicating that the data is ready for downloading was not received.

20. The switching arrangement of claim 18 wherein the first apparatus determines that that the data could be delivered to the second communications unit but was not received by the second communication when an acknowledgement from the second communications unit of the message indicating that the data is ready for downloading was received and the data was not retrieved by the second communications unit prior to the end of a validity period.

21. The switching arrangement method of claim 18 wherein the first apparatus determines that the data could be delivered to the second communications unit but was not received by the second communication unit when an acknowledgement from the second communications unit of the message indicating that the data is ready for downloading was received and an acknowledgment of receipt of the data was not received from the second communications unit.

* * * * *